(No Model.)
W. H. EDSALL.
EXTENSION BRACKET FOR CURTAIN POLES.
No. 311,237. Patented Jan. 27, 1885.
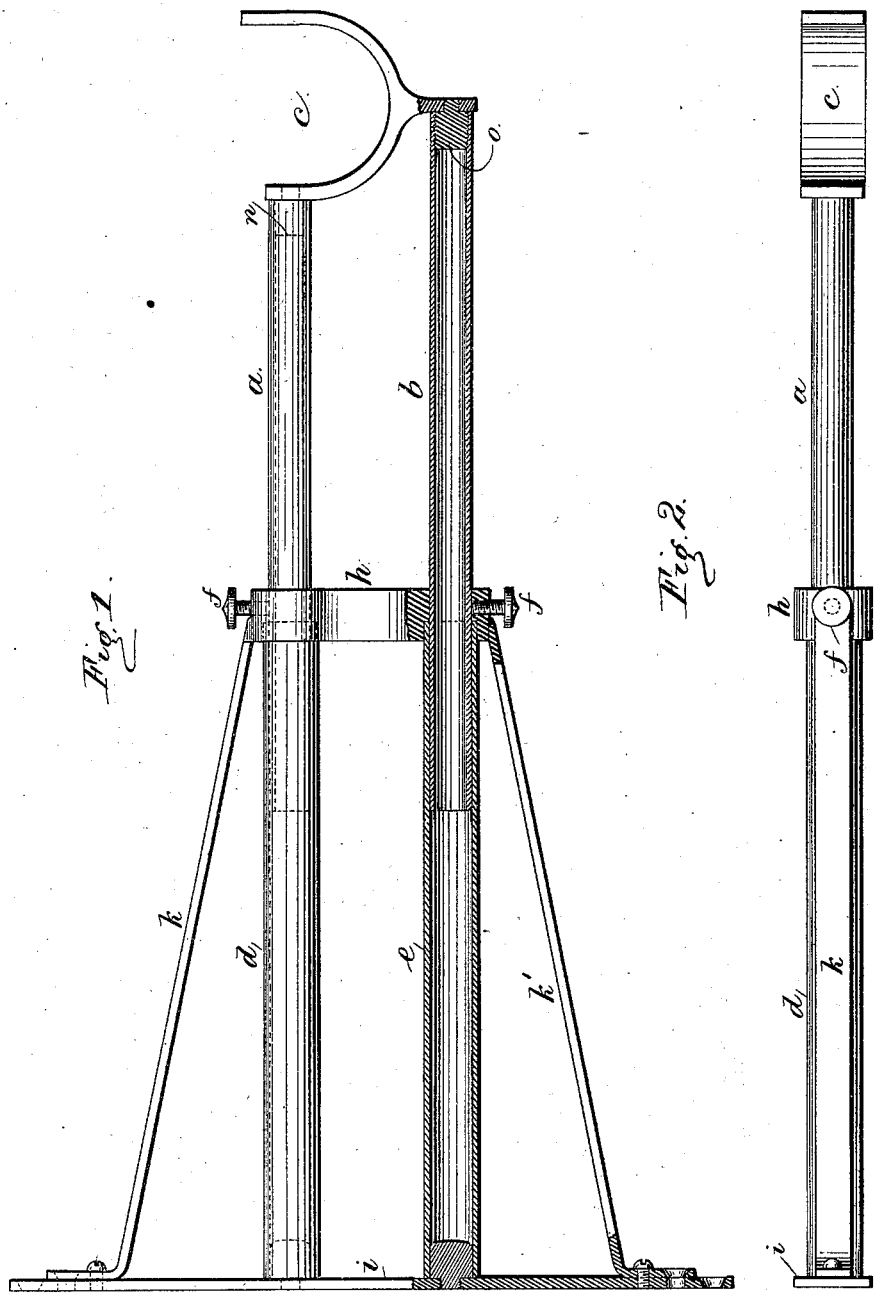

UNITED STATES PATENT OFFICE.

WILLIAM H. EDSALL, OF BROOKLYN, NEW YORK.

EXTENSION-BRACKET FOR CURTAIN-POLES.

SPECIFICATION forming part of Letters Patent No. 311,237, dated January 27, 1885.

Application filed February 27, 1884. (No model.)

*To all whom it may concern:*

Be it known that I, WILLIAM H. EDSALL, of Brooklyn, in the county of Kings and State of New York, have invented an Improvement in Extension-Brackets for Curtain-Poles, of which the following is a specification.

This invention relates to an extensible-bracket for curtain-poles, composed of two rods carrying a semicircular bearing for the curtain-pole, such rods sliding within tubes of larger diameter, which tubes are in a frame adapted to be screwed to the window-casing, with braces above and below the tubes. Clamping devices are provided for holding the sliding rods in the desired positions within the tubes.

In the drawings, Figure 1 is an elevation, partly in section, of my improved bracket; and Fig. 2 is a plan of the same.

*a b* represent the sliding rods, which are either solid or hollow, and the semicircular bearer *c* is attached at their outer ends.

*d e* represent tubes in which the rods *a b* can be moved endwise. The tubes *d e* are supported in a frame consisting of the end piece, *h*, plate *i*, and braces *k k'*, one brace being above the tubes, the other below them. In the portion *h* are openings through which the sliding rods *a b* pass. The front ends of the tubes *d e* enter sockets in the portion *h*, and the back ends of such tubes *d e* are riveted or otherwise attached to the plate *i*. The braces *k* extend at an inclination from the end piece, *h*, to which they are permanently fastened to the plate *i*, to which they are riveted or attached in any suitable manner.

*f f* are set-screws passing through the end piece, *h*, and bearing against the sliding rods *a b*, so as to clamp the same and hold them at any place to which they may be moved.

I have shown the semicircular bearing for the pole as provided with studs *n o*, having screw-threads on their cylindrical surfaces, and the tubes *a b* have screw-threads on their interior surfaces at the front ends, for firmly attaching the bearing to the tubes; but these parts may be made in one or attached together by any suitable means. The part *i* is provided with holes for the reception of screws, by which the bracket is attached to the wall, window or door casing, or other point of support.

By my improved extension-bracket the curtain-pole can be supported at any desired distance from the wall or casing, as circumstances may require.

I claim as my invention—

1. An extensible bracket for curtain-poles, consisting of two rods, a bearing for the curtain-pole, attached to the outer ends of the two rods, two tubes into which said rods slide, and a frame for such tubes, and clamping-screws for holding the sliding rods in the desired position, substantially as set forth.

2. The extensible bracket for curtain-poles, consisting of the rods *a b*, bearer *c*, tubes *d e*, clamping-screws *f*, end piece, *h*, plate *i*, and braces *k k'*, one above the tubes and the other below, substantially as set forth.

Signed by me this 19th day of February, A. D. 1884.

W. H. EDSALL.

Witnesses:
 GEO. T. PINCKNEY,
 WILLIAM G. MOTT.